Figure 1:
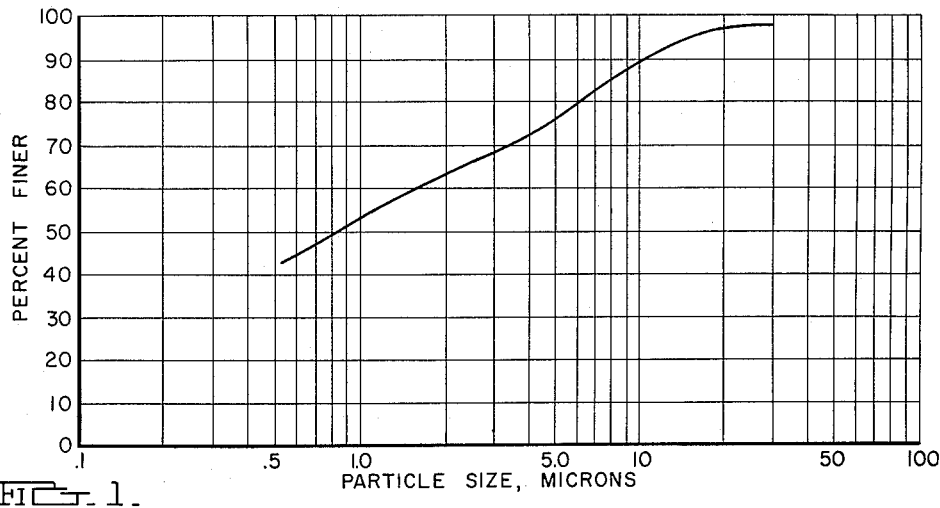

Jan. 12, 1960      E. J. HOUDRY      2,921,034

HYDROCARBON CRACKING CATALYST

Filed April 20, 1956      2 Sheets-Sheet 1

INVENTOR.
EUGENE J. HOUDRY
BY
ATTORNEY

INVENTOR.
EUGENE J. HOUDRY
BY
ATTORNEY

United States Patent Office 2,921,034
Patented Jan. 12, 1960

2,921,034

HYDROCARBON CRACKING CATALYST

Eugene J. Houdry, Ardmore, Pa.

Application April 20, 1956, Serial No. 579,635

8 Claims. (Cl. 252—455)

This invention relates to hydrocarbon conversion catalysts and in particular is concerned with silica-alumina hydrocarbon cracking catalysts.

This application is a continuation-in-part of copending application Serial No. 246,867 filed September 15, 1951, now abandoned by Eugene J. Houdry for Catalysts and Their Production.

Catalysts for the conversion or cracking of hydrocarbons, particularly for the conversion of petroleum fractions into gasoline of good octane rating, are prepared both synthetically and from natural clays. The synthetic catalyst, most commonly composites of synthetically prepared silica and alumina gels, generally speaking, possesses considerably higher activity for hydrocarbon conversion than those prepared from natural clays. On the other hand, the synthetic catalysts are considerably more expensive than the natural clays, and in many cases are softer materials subject to relatively high attrition rates during use. Many types of synthetic catalysts, because of their relatively low attrition resistance, are unsuitable for use in the so-called moving bed operations in which the catalyst is continually moved through the reactors in contrast to a fixed bed type of operation in which the catalyst remains in a fixed position.

Catalysts prepared from natural clays are, on the other hand, considerably cheaper than the synthetics and, generally speaking, have considerably better resistance to attrition losses during use. In contrast to the synthetics, however, the natural clays have a relatively low activity for the production of the desired type of products. In many cases, the activity and product distribution obtained from such natural clays is such as to make their use impractical in commercial operations. Some deposits of special types of natural clays have been discovered which provide commercially acceptable activity and product distribution, but the supply of such special clays is not plentiful.

There have in the past been attempts to provide mixtures of the synthetic catalysts with the natural clay catalysts which would possess the desirable characteristics of each, namely relatively high activity coupled with good physical properties of hardness and attrition resistance. It has heretofore been found, however, that mixing the synthetic catalysts with the natural clay, while producing some elevation in the activity index, results in a substantial loss of the desirable physical properties of the clay to such an extent that often the mixed synthetic-clay catalyst has physical properties which represent little improvement over the synthetic catalyst itself.

It has now been found in accordance with this invention that excellent hydrocarbon conversion catalysts may be prepared by mixing with a major proportion of a natural clay having relatively low activity for hydrocarbon conversion, a minor proportion of a synthetic catalyst which has been reduced to an extremely fine particle size such that a substantial proportion of the particles are in the sub-micron range while the average particle size is not greater than about 1 micron. As will appear from the detailed description which follows, catalysts prepared from such mixtures have activity indexes and produce product distributions which are substantially as favorable as those produced by the pure synthetic catalyst, while the physical properties such as hardness and attrition resistance are substantially equivalent to the pure natural clay catalyst.

Suitable synthetic catalysts include composites of silica and alumina, silica and zirconia, silica and magnesia, and silica and thoria, the invention however being particularly concerned with the use of a silica-alumina synthetic cracking catalyst. The use and preparation of such catalysts per se of course is well known in the art and, generally speaking, any of the known types of these catalysts may be employed in the invention. The proportion of silica to alumina or other oxide may vary considerably. The most commonly employed commercial type in which the proportion of silica predominates may be employed, or, on the other hand, catalysts having a high alumina to silica ratio may be used such as described in U.S. Patent No. 2,580,429. The synthetic catalyst may be prepared in any of the various ways known to the art from solutions of aluminum salts and silicates, by separate precipitation and subsequent mixing of the gels, by co-precipitation of the gels or other known methods.

After preparation of the wet gel, this should be dried at a temperature of for example 215° F. to 250° F. under controlled humidity conditions to remove loosely bound water of gelation and produce a dry, non-gelatinous material. This non-gelatinous material, often referred to as a dried gel, is preferably subjected to particle size reduction before any heat treatment to produce the calcined gel, although if desired some calcination of the gel may be carried out before subjecting the material to particle size reduction. Calcination as is well known in the art, consists of heating the precipitated material containing chemically bound hydrated water under controlled temperature conditions, usually not exceeding 1400° F. to drive off such hydrated water to produce a highly porous material of large internal surface area.

Particle size reduction may be carried out by any convenient suitable method which will produce the desired degree of subdivision. One suitable method involves the use of a colloid mill in which the material is wet ground while suspended as a slurry in water or other liquid vehicle. According to the invention, the particle size reduction must be carried out until the material has been reduced to an average size of about 1 micron with substantially 100% of the material consisting of particles of less than 50 microns in size. Stated more specifically, the subdivided material should have an apparent specific surface of about 60,000 $cm.^2/cm.^3$, assuming all particles to be cubes with sides having a length corresponding to the particle size as determined by sedimentation and electron microscope studies of the subdivided material. In such degree of subdivision, a substantial proportion of the material, ordinarily at least 40%, will consist of particles of sub-micron size. As will appear in more detail hereafter, when the synthetic catalyst in such degree of subdivision is mixed in minor proportion with a natural clay catalyst, the desirable physical properties of the clay are not substantially effected, while the activity of the composite is not appreciably below that of the synthetic material alone. On the other hand, as will be seen, mixtures of clay and the synthetic catalyst in less finely divided condition produces catalysts of inferior hardness and attrition resistance.

Natural clays which are suitable for use in the invention include broadly clays consisting predominantly of alumina-silicates, particularly those which are low in iron oxides and other easily reducible metal oxides such as copper, nickel, cobalt, etc. Certain clays, as is well known in the art, are particularly desirable for use as hydrocarbon conversion catalysts such as certain types of kaolins, sub-bentonites, montmorillonite and halloysite and the use of these types of clays is generally to be preferred. However, in many cases satisfactory results may also be obtained with clays of a type generally considered not suitable as hydrocarbon conversion catalysts such as china clays. In most cases it will be desirable to subject the clay to acid washing for the removal of iron or other undesirable impurities by any of the methods well known in the art.

The finely divided synthetic catalyst and the natural clay should be thoroughly intermixed with one another to provide the optimum physical properties. Failure to effect a thorough intermixing will result in reduced hardness and attrition resistance in the final product. Conveniently, the mixing may be accomplished by blending the two materials in an aqueous slurry and agitating this slurry by stirring, mulling, or the like, for a relatively extended period, for example 30 minutes or more.

After mixing, the moisture content of the mixture is adjusted to a level suitable for the type of shaping operation to be used. Pellets may be formed by a pelletizing operation in a manner well known in the art or extruded and cut to the desired length, or any other type of shaping operation well known in the art may be employed. If extrusion is employed, the moisture content of the mix will be found to have an important influence on the hardness and attrition qualities of the pellets produced. The optimum moisture content for extrusion will vary somewhat with the precise composition of the mixture and is best adjusted to the optimum value by experimentation. The optimum extrusion pressure will vary somewhat depending upon the moisture content and the composition but generally should be at least about 300 pounds per square inch to obtain pellets of good hardness.

After the shaping operation, the shaped material is dried to remove free moisture and then should be heat treated at a temperature of from 1000° F. to 1400° F. to provide an activated catalyst and to obtain optimum hardness and resistance to attrition.

The following examples illustrate the effect on hardness and resistance to attrition of the particle size of the synthetic catalyst contained in the synthetic catalyst-clay mixture.

EXAMPLE I

The synthetic catalyst employed was prepared by the co-precipitation of an aluminum salt and sodium silicate to form a gel which was then subjected to syneresis, dried, washed, base exchanged, filtered and then dried at a temperature of about 230° F. The resultant catalyst was a dry powder having the following chemical composition:

| | Percent |
|---|---|
| $SiO_2$ | 87.3 |
| $Al_2O_3$ | 12.2 |
| Impurities | 0.5 |

Screen analysis of the above powder showed the following particle sizes: 34.5% below 44 microns; 12.0% from 44 to 74 microns; 24.1% from 74 to 149 microns; and 29.4% above 149 microns.

This material was mixed with enough water to provide a water slurry containing about 30% by weight of dry solids (solids determined by evaporation of the slurry at a temperature of 250° F.). This slurry was repeatedly passed through a colloid mill of the type manufactured by the Troy Engine & Machine Company of Troy, Pennsylvania, consisting of a rotating disc and a stationary disc with means for adjusting the clearance between these discs and thus adjusting the intensity of the reduction action. The rotating disc revolves at a speed of approximately 20,000 r.p.m. while the slurry is pumped between it and the stator. During the grinding operation, approximately 50% by weight of the material was reduced to particles of sub-micron size while substantially 100% of the material was reduced to particles below about 40 microns in size. The material had a specific surface in excess of 60,000 cm.$^2$/cm.$^3$ At a dry solids content of about 45% by weight, the material assumed a smooth, pasty consistency, with little tendency to separate into two phases on prolonged standing.

The ground synthetic catalyst was mixed with china clay having the following approximate composition:

| | Percent |
|---|---|
| $SiO_2$ | 55.75 |
| $Al_2O_3$ | 43.45 |
| Impurities | 0.8 |

The materials were mixed in a water slurry containing the materials in the proportions of 20 parts by weight of the ground synthetic catalyst to 80 parts by weight of the above china clay. Thorough mixing of the particles was effected by prolonged stirring and the moisture content of the resulting mixture was adjusted to about 70% dry solids and about 30% liquid after which the mixture was extruded under a pressure of approximately 300 pounds per square inch. The extrudate was cut into pellets which were then heat treated at 1300° F. and then were subjected to the following tests:

*Hardness test*

The test apparatus consists of a steel blade 13.5 inches long, 1 inch deep, and 0.5 inch thick, hinged at one end, sharpened to a knife edge 3¾ inches to 4¾ inches from its hinged end, with a torsion spring suspended from its free end. The spring is calibrated and registers load up to 5 pounds. For measurements in excess of 5 pounds supplementary weights are hung from the bottom of the torsion spring. Tests are made by placing a pellet on its side with its axis at right angles to the knife at a marked distance 4 5/16 inches from the hinged end and gently pulled down on the torsion spring in such a way as to impart a steady pull and reading the amount of the pull at the time the sample fails. Several pellets are tested and the average of the readings recorded as the test result.

*Attrition test*

The apparatus comprises a small, motor-driven compressor which discharges into a pressure chamber made of 2½ inch standard pipe, 38 inches long, having at the discharge end a solenoid relief valve operated through an adjustable pressure trip mechanism. The relief valve discharges into the bottom of a vertical 1-inch standard pipe 110 inches high which has 100-mesh screens at each end supported by perforated plates. In making the test a weighed and measured sample of pelleted catalyst is introduced into the upright pipe above the bottom screen. With the pressure trip set at 25 pounds the compressor develops enough compressed air to build the pressure from 0 to 25 pounds gage and trip the solenoid every six seconds. At each releasing action of the solenoid the catalyst is blown up the upright pipe against the top screen and falls back again against the bottom screen when the solenoid valve closes, remaining closed while the pressure is being built up again in the pressure chamber. Each test lasts two hours, during which the catalyst is blown up the pipe 1200 times. At the end of two hours the sample of catalyst is re-weighed and the difference in weight expressed in percent is the attrition loss. This is rather a severe accelerated test but gives the effects of (1) pellets rubbing against each other, (2) pellet erosion from physical contact with the walls of a vessel, (3) impact at the top of the blast, and (4) impact due to pellets dropping on each other and against a metallic base.

Cat A test

This standard test for determining the activity of the catalyst for the catalytic cracking of hydrocarbons is carried out by passing a standard charge of East Texas gas oil in contact with a sample of catalyst at a temperature of 850° F., a space rate of 1.5 volumes of oil per hour per volume of catalyst per hour, for an on-stream time of 10 minutes. The yield of gasoline, of gas, and of coke are determined. For comparison purposes, the activity of the catalyst is given in terms of the percent gasoline produced during this test. For example, if the yield of gasoline during this test is 28%, the activity of the catalyst is given as 28.

The results of the above tests on the catalysts prepared as above were as follows:

Hardness test _____ pounds __ 7.9
Attrition test _____ percent loss __ 13.1
Cat A test:
    Gasoline _____ percent __ 40
    Gas _____ do ____ [1] 10.4
    Coke _____ do ____ 3.6

EXAMPLE II

To compare the results obtained in Example 1 with those obtained when using a synthetic catalyst which has not been subjected to extreme particle size reduction as in Example I, catalyst pellets were prepared composed of 80 parts of china clay and 20 parts of the synthetic silica-alumina catalyst powder without the drastic size reduction employed in Example I and were tested for hardness and attrition resistance. The results of these tests were as follows:

Hardness test _____ pounds __ 3.8
Attrition test _____ percent loss __ 88

EXAMPLE III

Catalyst pellets were prepared in the same manner as in Example I with the exception that instead of using china clay and synthetic catalyst in the ratio of 80:20, these materials were used in the ratio of 60:40. These pellets were subjected to the three tests as outlined in Example I with the following results:

Hardness test _____ pounds __ 12.2
Attrition test _____ percent loss __ 7
Cat A test:
    Gasoline _____ percent __ 42.6
    Gas _____ do ____ 12.1
    Coke _____ do ____ 3.2

EXAMPLE IV

Example III was repeated with the exception that instead of using synthetic catalyst which had been subjected to the drastic size reduction as in Example I, the unground material described in Example I was employed. The resultant pellets were subjected to hardness and attrition tests with the following results:

Hardness test _____ pounds __ 1.8
Attrition test _____ percent loss __ 98

EXAMPLE V

A synthetic silica-alumina catalyst of the same composition as in Example I was subjected to the same grinding procedure in a colloid mill and reduced to substantially the same particle size. This material was blended in a water slurry with a commercial bentonite type clay produced by the Filtrol Corporation in the proportion of 82% by weight of bentonite clay to 18% by weight of synthetic catalyst (dry basis). Extruded pellets were formed from this mixture and after heat treatment at 1300° F. were subjected to the tests as outlined in Example I with the following results:

Hardness test _____ pounds __ 8.6
Attrition test _____ percent loss __ 24.2
Cat A test:
    Gasoline _____ percent __ 40
    Gas _____ do ____ 10.8
    Coke _____ do ____ 3.1

EXAMPLE VI

Example V was repeated except that instead of using the synthetic catalyst which had been subjected to the drastic size reduction procedure, the original catalyst powder described in Example I was employed. The resultant pellets were tested for hardness and attrition with the following results:

Hardness test _____ pounds __ 4.3
Attrition test _____ percent loss __ 71

The following examples illustrate the effect of varying the proportion of the synthetic catalyst to the natural clay catalyst upon the attrition loss and the properties of the material for the conversion of hydrocarbons.

EXAMPLES VII to XII

The synthetic catalyst used in these examples was prepared by co-precipitation of an aluminum salt and sodium silicate to form a gel which was then dried, washed, base exchanged, filtered and dried at a temperature of approximately 250° F. The resultant catalyst had the following approximate composition:

Percent
$SiO_2$ _____ 87.5
$Al_2O_3$ _____ 12.5
Impurities _____ 0.5 and had a particle size similar to that described in Example I for the synthetic catalyst before the particle size reduction operation. The synthetic material was subjected to a drastic size reduction operation in a colloid mill in the manner described in Example I. When the colloiding operation was completed, the material was examined for particle size distribution. Figure 1 shows the particle size distribution on a semi-log graph as determined by the Bouyoucas hydrometer method based upon Stokes' law for the settling rate of particles suspended in a fluid. A typical procedure using this method is described in ASTM Standard (1952) part 3, published by the American Society for Testing Materials, pages 1420 to 1430 (ASTM Designation: D422–51). As may be seen from this distribution curve, over 50% of the material has been reduced to particles in the sub-micron range while substantially 100% of the material consists of particles of less than 30 microns in size. The specific surface of this material is of the order of 80,000 $cm.^2/cm.^3$.

The natural clay employed in these examples consisted of a kaolin known commercially as Edgar Plastic Kaolin.

From these two materials, catalyst pellets were prepared as follows varying in composition from 100% kaolin to 100% synthetic catalyst. The catalysts in each case were made in pellet form by extrusion with average dimensions of 5 millimeters diameter by 5 millimeters long. Each was heat treated for two hours at approximately 1300° F. in bone dry air before being tested.

| Example: | Catalyst composition |
|---|---|
| VII | 100% kaolin. |
| VIII | 80% kaolin–20% synthetic catalyst. |
| IX | 60% kaolin–40% synthetic catalyst. |
| X | 40% kaolin–60% synthetic catalyst. |
| XI | 20% kaolin–80% synthetic catalyst. |
| XII | 100% synthetic catalyst. |

The catalysts of the above composition were subjected to attrition tests and Cat A tests as described in Example ---
[1] 1.44 gravity-reference air.

I except that in these cases the Cat A test was carried out at a temperature of 800° F. with the oil passing over 200 cc. of catalyst at a rate of 5 cc. per minute. The Cat A test was carried out on the catalyst both before and after a steam treatment, the steam treatment being carried out at 1000° F. for two hours at 60 pounds per square inch gage steam pressure.

Figure 5:
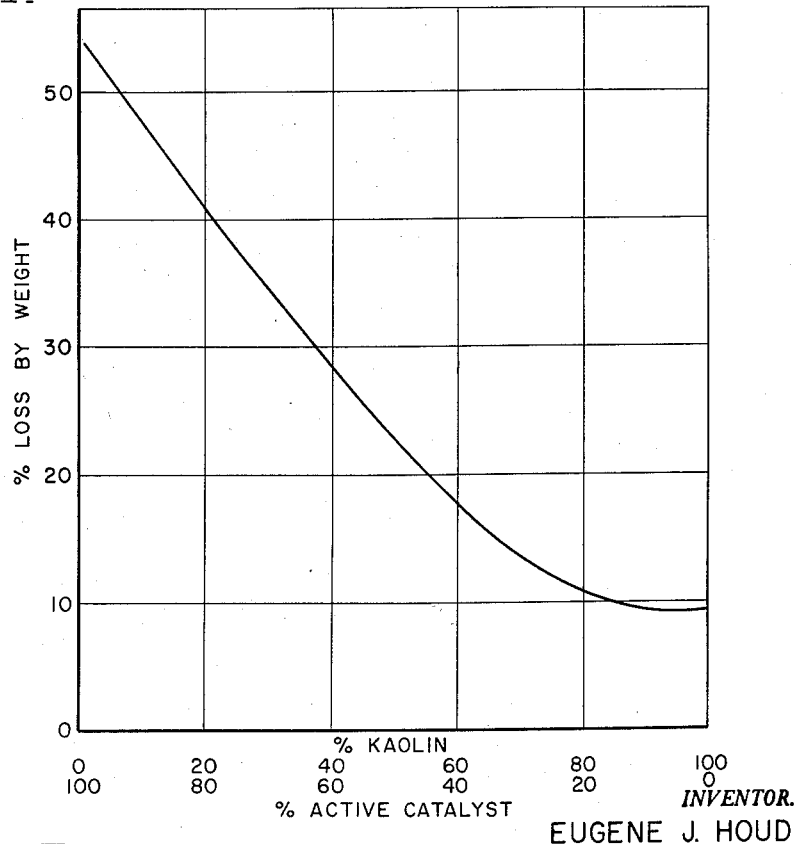

Figs. 2 to 5 inclusive show the results obtained from the above tests. Referring to Fig. 5, it may be seen that the use of a high percentage of the synthetic catalyst results in relatively high attrition rates. On the other hand, it may be seen that as the percent of synthetic catalyst in the mixture increases from zero to about 40% only a relatively small decrease in the attrition resistance is experienced.

Figure 2:
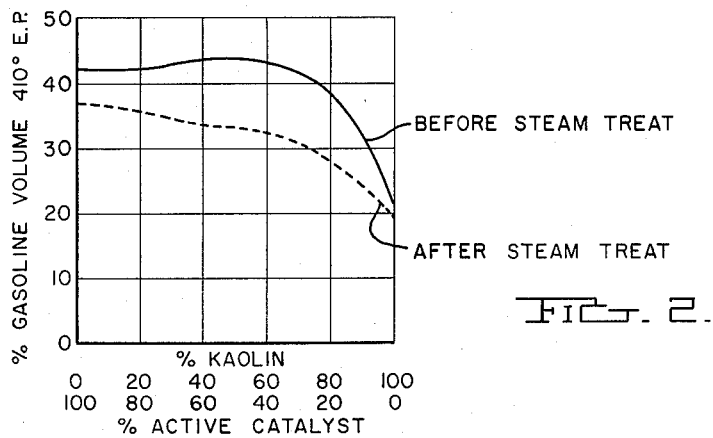

Referring now to Fig. 2, showing the percent gasoline produced in the Cat A Test on the catalysts prepared according to Examples VII to XII, it may be seen that the catalytic activity of the synthetic-clay mixture remains substantially constant as the content of synthetic catalyst varies between from 100% down to about 30%, after which it begins to decline. The decline is relatively gradual until the content of synthetic catalyst falls below about 15% after which the activity drops steeply, as may be seen in the graph. The activity of the catalyst after steam treatment follows the same general pattern.

Figure 3:
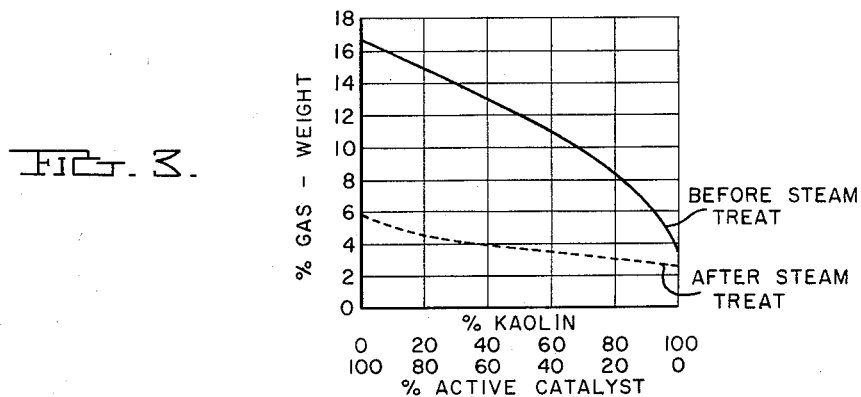

Referring now to Fig. 3, showing the percent gas produced during the Cat A Test for the catalyst compositions given above, it may be seen that the gas make is relatively high before the steam treatment for compositions containing a high percentage of synthetic catalyst, but drops rather steeply as the percentage of synthetic catalyst decreases. The behavior of the catalyst after steam treatment follows the same trend, although the overall gas make is sharply reduced.

Figure 4:
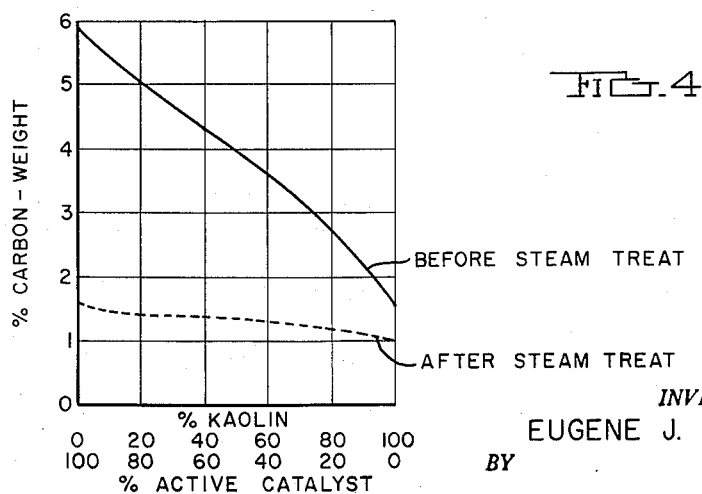

Referring to Fig. 4, showing the percent of carbon deposited on the catalyst during the Cat A Test using the compositions described above, it may be seen that before steam treatment the carbon lay-down is high when the percent of synthetic catalyst in the composition is high but drops steeply as the percentage of synthetic decreases. The behavior after steam treatment follows the same trend but, as in the case of the gas make, the overall carbon lay-down is sharply reduced following the steam treatment.

From the above discussion it may be seen that the presence of a major proportion of the relatively inert kaolin in the mixture has surprisingly little effect upon the catalytic activity until the percentage of kaolin exceeds about 85%. Similarly it may be seen that the presence of the synthetic catalyst in the mixture does not substantially effect the attrition resistance until the percentage of synthetic exceeds about 40% by weight.

It is thus apparent that a surprising combination of high attrition resistance and high activity may be obtained by using compositions in which the proportions of clay to synthetic catalyst range from 60:40 to 85:15. It should also be noted that compositions in this range produce the best product distributions, that is to say, the most desirable ratios of gasoline to gas and of gasoline to carbon. This is apparent from a comparison of Figs. 2, 3 and 4 where it may be seen that for compositions containing from 60% to 85% clay, the gasoline production is at, or close to, optimum while the production of gas and coke is approaching the minimum.

Particularly preferred compositions in accordance with the invention contain the natural clay and synthetic catalyst in proportions ranging from 70:30 to 80:20.

It is to be understood that the specific embodiments described above are not intended to limit the invention and that other modifications apparent to those skilled in the art are intended to be included within the scope of the appended claims.

I claim:

1. A method for the preparation of catalysts for the conversion of hydrocarbons comprising the steps of subjecting a non-gelatinous form of a synthetic silica-alumina catalyst having relatively high activity for hydrocarbon conversion to particle size reduction until substantially 100% thereof consists of particles of less than 50 microns in size and the specific surface thereof is at least 60,000 cm.$^2$/cm.$^3$, mixing said subdivided catalyst with a natural clay comprised predominantly of alumina-silicates and having a relatively low activity for hydrocarbon conversion, said clay and said synthetic catalyst being mixed in proportions ranging from 60:40 to 85:15, thereafter shaping said mixture into catalyst pellets of the desired size and shape, and heat treating said pellets.

2. A method in accordance with claim 1 in which the synthetic catalyst is in an uncalcined, non-gelatinous form when subjected to particle size reduction.

3. A method in accordance with claim 1 in which the proportions of clay to synthetic catalyst range from 70:30 to 80:20.

4. A method in accordance with claim 2 in which the proportions of clay to synthetic catalyst are from 70:30 to 80:20.

5. Catalyst pellets for the conversion of hydrocarbons comprising a mixture consisting essentially of a natural clay comprised predominantly of alumina-silicates having relatively low activity for hydrocarbon conversion and a synthetic silica-alumina catalyst having relatively high activity for hydrocarbon conversion, said clay and said synthetic catalyst being mixed in proportions ranging from 60:40 to 85:15, said catalyst pellets being shaped from a mixture of said clay with a non-gelatinous form of said synthetic catalyst in such degree of subdivision that substantially 100% thereof consists of particles of less than 50 microns in size and the specific surface thereof is at least about 60,000 cm.$^2$/cm.$^3$ 6. Catalyst pellets in accordance with claim 5 in which the synthetic catalyst in the mixture from which the catalyst pellets are shaped is in a non-gelatinous uncalcined form.

7. Catalyst pellets for the conversion of hydrocarbons comprising a mixture consisting essentially of a kaolin having relatively low activity for hydrocarbon conversion and a synthetic silica-alumina catalyst of relatively high activity for hydrocarbon conversion, said kaolin and said synthetic catalyst being mixed in proportions ranging from 60:40 to 85:15, said catalyst pellets being shaped from a mixture of said kaolin with a non-gelatinous form of said synthetic catalyst in such degree of subdivision that substantially 100% thereof consists of particles of less than 50 microns in size and the specific surface thereof is at least 60,000 cm.$^2$/cm.$^3$ 8. Catalyst pellets in accordance with claim 7 in which the proportions of kaolin to synthetic catalyst range from 70:30 to 80:20.

References Cited in the file of this patent

UNITED STATES PATENTS

| | | |
|---|---|---|
| 2,361,978 | Swearingen | Nov. 7, 1944 |
| 2,535,948 | Nicholson et al. | Dec. 26, 1950 |
| 2,580,429 | Houdry | Jan. 1, 1952 |
| 2,617,169 | Bodkin | Nov. 11, 1952 |
| 2,669,547 | Shabaker | Feb. 16, 1954 |
| 2,695,893 | Houdry | Nov. 30, 1954 |